United States Patent
Sato et al.

(10) Patent No.: US 8,941,942 B2
(45) Date of Patent: Jan. 27, 2015

(54) METHOD FOR ADJUSTING LINEAR RECORDING DENSITY AND MAGNETIC DISK DRIVE

(71) Applicant: Kabushiki Kaisha Toshiba, Minato-ku, Tokyo (JP)

(72) Inventors: Hiroaki Sato, Yokohama (JP); Hiroyuki Tanaka, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/835,731

(22) Filed: Mar. 15, 2013

(65) Prior Publication Data

US 2014/0146411 A1    May 29, 2014

(30) Foreign Application Priority Data

Nov. 28, 2012 (JP) ................... 2012-259560

(51) Int. Cl.
G11B 21/02 (2006.01)
G11B 5/09 (2006.01)
G11B 20/12 (2006.01)

(52) U.S. Cl.
CPC .................................. G11B 20/1217 (2013.01)
USPC ............... 360/75; 360/31; 360/48; 360/77.02

(58) Field of Classification Search
None
See application file for complete search history.

(56) References Cited

U.S. PATENT DOCUMENTS

| | | | |
|---|---|---|---|
| 5,430,581 A | 7/1995 | Moribe et al. | |
| 5,666,334 A | 9/1997 | Tokuyama et al. | |
| 5,946,153 A * | 8/1999 | Emo et al. | 360/48 |
| 6,957,379 B1 * | 10/2005 | Patapoutian et al. | 714/774 |
| 7,012,771 B1 * | 3/2006 | Asgari et al. | 360/31 |
| 7,102,838 B2 * | 9/2006 | Kim et al. | 360/31 |
| 7,385,778 B2 * | 6/2008 | Kakiki | 360/75 |
| 7,430,090 B2 * | 9/2008 | Oyamada et al. | 360/75 |
| 7,508,616 B2 * | 3/2009 | Fitzpatrick et al. | 360/75 |
| 7,515,376 B2 * | 4/2009 | Emo et al. | 360/78.07 |
| 7,752,491 B1 * | 7/2010 | Liikanen et al. | 714/6.13 |
| 8,619,383 B1 * | 12/2013 | Jung et al. | 360/75 |
| 2004/0136105 A1 * | 7/2004 | Ma et al. | 360/31 |
| 2006/0082918 A1 | 4/2006 | Kosugi et al. | |
| 2006/0227445 A1 * | 10/2006 | Chiao et al. | 360/31 |
| 2007/0030593 A1 * | 2/2007 | Hiroyuki et al. | 360/128 |
| 2007/0268615 A1 * | 11/2007 | McFadyen et al. | 360/75 |
| 2010/0073805 A1 * | 3/2010 | Amano | 360/75 |

FOREIGN PATENT DOCUMENTS

| | | |
|---|---|---|
| JP | 05-182120 A | 7/1993 |
| JP | 08-129705 A | 5/1996 |
| JP | 2006-114142 A | 4/2006 |

* cited by examiner

*Primary Examiner* — Dismery Mercedes
(74) *Attorney, Agent, or Firm* — Knobbe Martens Olson & Bear LLP

(57) ABSTRACT

According to one embodiment, there is provided a method, implemented in a magnetic disk drive, for adjusting a linear recording density. The method obtains a first flying-dependent error sensitivity for each of two or more heads. The first flying-dependent error sensitivity represents a change in read error rate corresponding to a change in flying height of the head during write. In addition, the method reduces the linear recording density of a first recording surface associated with a first head of the two or more heads if the first flying-dependent error sensitivity is a second flying-dependent error sensitivity higher than a threshold and corresponds to the first head.

9 Claims, 10 Drawing Sheets

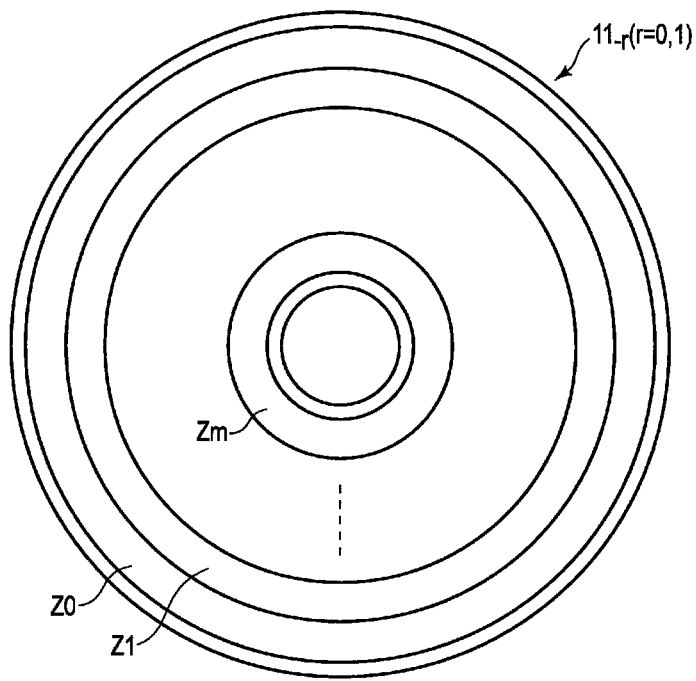
F I G. 2
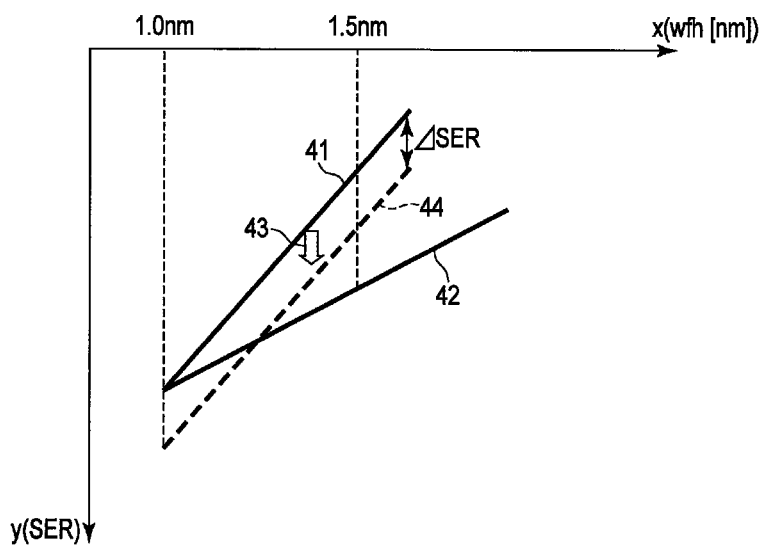
F I G. 4

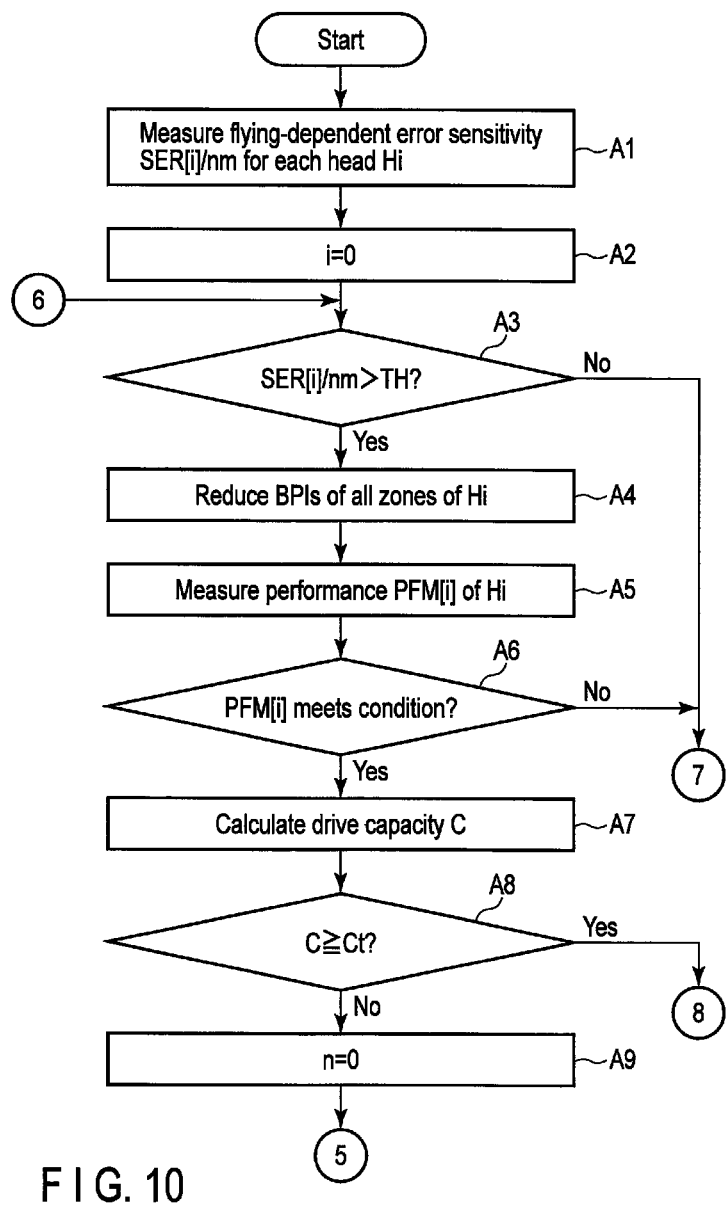
F I G. 10

METHOD FOR ADJUSTING LINEAR RECORDING DENSITY AND MAGNETIC DISK DRIVE

CROSS-REFERENCE TO RELATED APPLICATIONS

This application is based upon and claims the benefit of priority from Japanese Patent Application No. 2012-259560, filed Nov. 28, 2012, the entire contents of which are incorporated herein by reference.

FIELD

Embodiments described herein relate generally to a method for adjusting a linear recording density and a magnetic disk drive.

BACKGROUND

In recent years, the recording density of magnetic disk drives has been significantly improved. With the recording density of magnetic disk drives improved, the spacing between a magnetic head (more specifically, a read element and a write element of the magnetic head) and a recording surface of a magnetic disk has been increasingly reduced. For example, in a recently-emerged magnetic disk drive, the distance between the magnetic head (hereinafter referred to as the head) and the magnetic disk (hereinafter referred to as the disk), that is, the flying height of the head, is about 1 nanometer (nm).

The reduced spacing is likely to induce a high-fly write failure (hereinafter referred to as an HFW failure). The HFW failure refers to a phenomenon in which data is written by the head to the disk at a spacing larger than a normally set spacing. A cause of the increased spacing for the head is a collision of the head against a surface lubricant on the disk or grease spattered on the disk, leading to jump-up of the head.

When data is written by the head to the disk at an increased spacing, an error is likely to occur when the data is read (that is, a read error is likely to occur). A sector error rate (SER) is known as an index indicative of the rate at which read errors occur. The SER is measured for each of the heads arranged in association with the respective recording surfaces of the disks. The SER in this case is indicative of the rate at which read errors occur when data is read by the head from the corresponding recording surface of the disk in units of sectors. Furthermore, a magnetic disk drive in which the recording surface of the disk is partitioned into a plurality of zones for management may measure the SER for each combination of the head and the zone. The SER in this case is indicative of the rate at which read errors occur when data is read by the head from the corresponding zone of the disk in units of sectors.

The conventional magnetic disk drives adjust the format of the recording surface of the disk, for example, a linear recording density BPI (Bits Per Inch) for each head (or for each head and zone), so as to make the SERs corresponding to all the heads (or combinations of all the heads and all the zones) equivalent.

As described above, when data is written by the head to the disk at an increased spacing, an error is likely to occur when the data is read. For such a head, when the SER is measured with the flying height of the head increased, the SER is significantly degraded. Here, an index indicative of a change (degradation) in SER (read error rate) corresponding to a change in the flying height of the head (more specifically, a change by a unit length, for example, a change by 1 nm) is intended to be referred to as flying-dependent error sensitivity [SER/nm].

The flying-dependent error sensitivity [SER/nm] varies depending on the head. In connection with the flying-dependent error sensitivity [SER/nm], heads are roughly classified into a first type and a second type. The first type head has a high flying-dependent error sensitivity [SER/nm], and thus the SER of the first type head is significantly increased (that is, the SER is degraded) by a slight increase in flying height during write. The second type head has a low flying-dependent error sensitivity [SER/nm], and thus the SER of the second type head is not significantly increased by a slight increase in flying height during write.

However, in adjusting the format of the recording surface of the disk, the conventional art fails to take into account whether the head associated with the recording surface is of the first type in which the SER of the head is significantly increased by a slight increase in flying height during write. Thus, the conventional art has difficulty preventing the read error rate from being increased by an HFW failure if the head is of the first type.

BRIEF DESCRIPTION OF THE DRAWINGS

FIG. 2 is a diagram schematically showing an exemplary format of a recording surface of a disk applied in the embodiment;

FIG. 4 is a diagram schematically illustrating how the format of the recording surface of the disk is adjusted according to the embodiment;

FIG. 10 is a diagram showing a part of a flowchart illustrating an exemplary procedure for format adjustment applied in a modification of the embodiment;

DETAILED DESCRIPTION

In general, according to one embodiment, there is provided a method, implemented in a magnetic disk drive, for adjusting a linear recording density. The magnetic disk drive comprises one or more disks and two or more heads. The one or more disks comprise two or more recording surfaces. The two or more heads are associated with the respective two or more recording surfaces. The method obtains a first flying-dependent error sensitivity for each of the two or more heads. The first flying-dependent error sensitivity represents a change in read error rate corresponding to a change in flying height of the head during write. The method compares the first flying-dependent error sensitivity of each of the two or more heads with a threshold. In addition, the method reduces the linear recording density of a first recording surface associated with a first head of the two or more heads if the first flying-dependent error sensitivity is a second flying-dependent error sensitivity higher than the threshold and corresponds to the first head.

Figure 1:
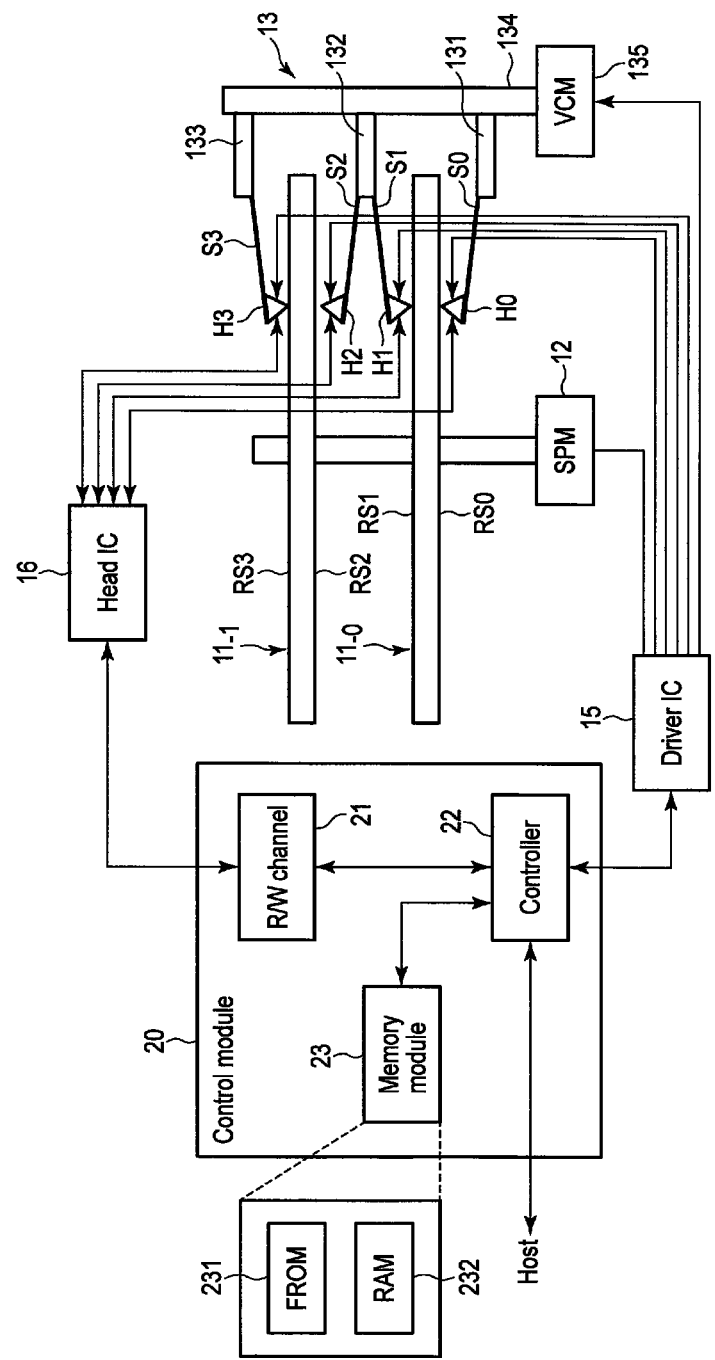
FIG. 1 is a block diagram showing an exemplary configuration of a magnetic disk drive according to an embodiment.

FIG. 1 is a block diagram showing a configuration of a magnetic disk drive according to an embodiment. The magnetic disk drive shown in FIG. 1 comprises one or more disks (magnetic disks), for example, two disks $11_{-0}$ and $11_{-1}$, two or more heads (magnetic heads), for example, four heads H0, H1, H2, and H3, a spindle motor (SPM) 12, and a voice coil motor (VCM) actuator 13.

Disks $11_{-0}$ and $11_{-1}$ are magnetic recording media arranged at a given interval between the media. A lower surface (that is, a lower disk surface) and an upper surface (that is, an upper disk surface) of disk $11_{-0}$ form recording surfaces RS0 and RS1 on which data is magnetically recorded. That is, disk $11_{-0}$ comprises two recording surfaces RS0 and RS1. A lower surface and an upper surface of disk $11_{-1}$ form recording surfaces RS2 and RS3 on which data is magnetically recorded. That is, disk $11_{-1}$ comprises the two recording surfaces RS2 and RS3. Disks $11_{-0}$ and $11_{-1}$ are rotated at high speed by the SPM 12. The SPM 12 is driven by, for example, a drive current supplied by a driver IC 15 described below.

FIG. 2 is a diagram schematically showing an exemplary format of a recording surface of disk $11_{-r}$ (r=0, 1) applied in the embodiment. As shown in FIG. 2, the recording surface of disk $11_{-r}$ is partitioned into m+1 zones Z0, Z1, . . . , and Zm in a radial direction for management. That is, the recording surface of disk $11_{-r}$ comprises the m+1 zones Z0, Z1, . . . , and Zm. Each of zones Z0 to Zm comprises a plurality of tracks.

Referring back to FIG. 1, heads H0 and H1 are arranged in association with the lower surface (recording surface RS0) and upper surface (recording surface RS1), respectively, of disk $11_{-0}$. Heads H2 and H3 are arranged in association with the lower surface (recording surface RS2) and upper surface (recording surface RS3), respectively, of disk $11_{-1}$. Each of heads H0 to H3 comprises a read element, a write element, and a heater element (none of these elements is shown in the drawings). The heads H0 and H1 (more specifically, the write elements and read elements of heads H0 and H1) are used to write data to and read data from recording surfaces RS0 and RS1, respectively, of disk $11_{-0}$. Heads H2 and H3 (more specifically, the write elements and read elements of heads H2 and H3) are used to write data to and read data from recording surfaces RS2 and RS3, respectively, of disk $11_{-1}$.

A heater element in head Hi (i=0, 1, 2, 3) generates heat when supplied with power by a driver IC 16 under the control of a controller 22. The heater element thus thermally expands a portion of head Hi which is associated with the heater element, toward recording surface RSi of the disk. This adjusts the distance between head Hi and recording surface RSi of the disk, that is, the flying height of head Hi.

The VCM actuator 13 comprises, for example, three arms 131, 132, and 133. Head H0 is attached to a tip of suspension S0 extending from the arm 131 of the VCM actuator 13 (more specifically, to a head slider provided at the tip of suspension S0)). Heads H1 and H2 are attached to tips of suspensions S1 and S2 extending from the arm 132 of the VCM actuator 13. Head H3 is attached to a tip of suspension S3 extending from the arm 133 of the VCM actuator 13.

The arms 131 to 133 of the VCM actuator 13 are pivotally movably supported around a pivot 134. The VCM actuator 13 comprises a VCM 135. The VCM 135 is a driving source for the VCM actuator 13. The VCM 135 is driven in accordance with a drive current supplied by the driver IC 15 to pivotally move the arms 131 to 133 of the VCM actuator 13 around the pivot 134 at the same time. That is, the VCM 135 causes movement of the arms 131 to 133 in a radial direction of disks $11_{-0}$ and $11_{-1}$. This causes the movement of heads H0 to H3 in the radial direction of disks $11_{-0}$ and $11_{-1}$ so as to draw an arc.

The magnetic disk drive shown in FIG. 1 further comprises the driver IC 15, the head IC 16, and a control module 20. The driver IC 15 drives an SPM 12 and the VCM 135 (VCM actuator 13) under the control of the control module 20 (more specifically, the controller 22 in the control module 20 described below). The driver IC 15 also controls power supplied to the heater element in head Hi (i=0, 1, 2, 3) under the control of the control module 20 (controller 22).

The head IC 16 is referred to as a head amplifier, and amplifies a signal read by a selected single one of heads H0 to H3 (that is, a single read signal). The head IC 16 also coverts write data output by the control module 20 (more specifically, an R/W channel 21 in the control module 20, which will be described below) into a write current, and outputs the write current to the selected single head.

The control module 20 is implemented by a system LSI having a plurality of elements integrated on a single chip. The control module 20 comprises the read/write (R/W) channel 21, the controller 22, and a memory module 23.

The R/W channel 21 processes signals related to reads and writes. That is, the R/W channel 21 converts a single read signal amplified by the head IC 16 into digital data, and decodes the digital data into read data. The R/W channel 21 also extracts servo data from the digital data. The R/W channel 21 further codes write data transferred by the controller 22, and transfers the coded write data to the head IC 16.

The controller 22 controls write of data to disks $11_{-0}$ and $11_{-1}$ and read of data from disks $11_{-0}$ and $11_{-1}$. That is, the controller 22 functions as a disk controller. The controller 22 also transmits signals to a host device (hereinafter referred to as a host) via an external interface (storage interface) and receives signals from the host via the external interface. That is, the controller 22 also functions as a host controller. Specifically, the controller 22 receives commands (a write command, a read, command, and the like) from the host via the external interface. The controller 22 further controls data transfers between the host and the controller 22.

The host utilizes the magnetic disk drive shown in FIG. 1 as the host's own storage device. The host and the magnetic disk drive shown in FIG. 1 are provided in an electronic device such as a personal computer, a video camera, a music player, a portable terminal, a cellular phone, or a printer.

The controller 22 also controls the VCM 135 via the driver IC 15 in order to position the head selected from heads H0 to H3 at a target position on the corresponding disk. The controller 22 further controls a seek operation of moving the selected head to a target track. That is, the controller 22 functions as a servo controller.

The controller 22 also controls the driver IC 15 and thus power supplied to the heater element in head Hi (i=0, 1, 2, 3)

by the driver IC 15. Thus, the flying height of head Hi is controlled. The rate (read error rate) at which errors (read errors) occur during read of data from the disk, that is, the SER, depends on the flying height of head Hi when the data is written to the disk. Power supplied to the heater element in head Hi to control the flying height of head Hi to a target height during data write is referred to as write heater power whp.

The controller 22 further measures flying-dependent error sensitivity [SER/nm] for each combination of head Hi (i=0, 1, 2, 3) and zone Zj (j=0, 1, . . . , m) (or for each head Hi). The controller 22 adjusts the linear recording density BPI of zone Zj of recording surface RSi (or the linear recording density BPI of recording surface RSi) based on the flying-dependent error sensitivity [SER/nm] for each combination of head Hi and zone Zj (or for each head Hi).

According to the embodiment, the controller 22 comprises a microprocessor unit (MPU). The MPU executes a control program stored in a FROM 231 described below to implement the functions of the controller 22.

The memory module 23 comprises the flash ROM (FROM) 231 and a RAM 232. The FROM 231 is a rewritable nonvolatile memory. A control program (firmware) for implementing the functions of the control module 20 including the controller 22 is pre-stored in a part of a storage area of the FROM 231. Another part of the storage area of the FROM 231 stores adjustment parameters used to adjust the format of recording surfaces RS0 to RS3 of disks $11_{-0}$ and $11_{-1}$. At least a part of a storage area in the RAM 232 is used as a work area for the controller 22.

Figure 3:
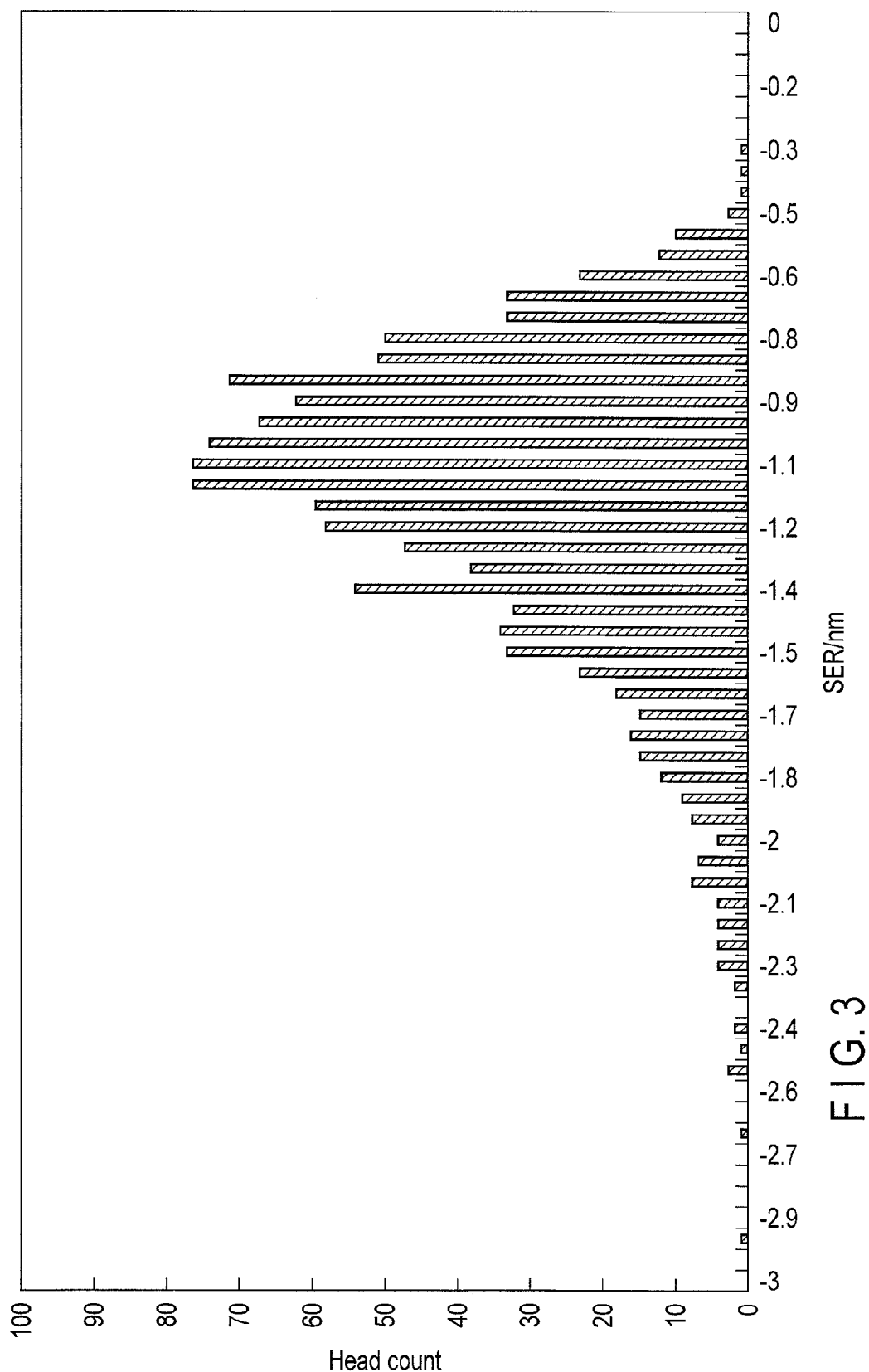
FIG. 3 is a diagram showing an example of the distribution of a flying-dependent error sensitivity measured during the steps of manufacturing a plurality of magnetic disk drives including the magnetic disk drive shown in FIG. 1.

FIG. 3 shows an example of the distribution of the flying-dependent error sensitivity [SER/nm] measured during the steps of manufacturing a plurality of magnetic disk drives including the magnetic disk drive shown in FIG. 1. In FIG. 3, the abscissa represents the flying-dependent error sensitivity [SER/nm], and the ordinate represents the number of heads (head count). The flying-dependent error sensitivity [SER/nm] represents a change in error rate (more specifically, the sector error rate SER) resulting from a change in the flying height of head Hi by a unit length (for example, 1 nm). According to the embodiment, the error rate (sector error rate SER) is expressed as a negative value as described below. Thus, the flying-dependent error sensitivity [SER/nm] is also expressed as a negative value. A flying-dependent error sensitivity [SER/nm] with a larger absolute value is indicative of a more significant change in sector error rate SER, that is, a high flying-dependent error sensitivity.

Here, if the number of error sectors is not zero, the sector error rate SER is expressed as:

SER=log(number of error sectors/number of read sectors)

Furthermore, if the number of error sectors is zero, then for convenience, sector error rate SER is expressed as follows:

SER=log(1/number of read sectors)

Apparently, the sector error rate SER is smaller than zero and thus has a negative value. Furthermore, with the same number of read sectors, the sector error rate decreases and increases (toward zero) consistently with the number of error sectors. The state in which the sector error rate SER is small is referred to as a low sector error rate SER. The state in which the sector error rate SER is great is referred to as a high sector error rate SER.

As described above, in connection with calculation of the sector error rate SER, the embodiment treats the error sector number 0 the same as the error sector number 1. However, treating the error sector number 0 the same as the error sector number 1 is prevented from affecting the determination of magnitude of the flying-dependent error sensitivity [SER/nm] described below.

Now, how the format of the recording surface of the disk is adjusted will be described in brief with reference to FIG. 4. FIG. 4 shows the flying-dependent error sensitivity characteristics of the first type head and the flying-dependent error sensitivity characteristics of the second type head. In FIG. 4, the x-axis (abscissa) represents the flying height wfh[nm] of the head during write (write flying height wfh[nm]). The y-axis (ordinate) represents the sector error rate SER. The direction of the arrow on the y-axis indicates a negative direction. A line 41 represents the flying-dependent error sensitivity characteristics of the first type head. A line 42 represents the flying-dependent error sensitivity characteristics of the second type head. The flying-dependent error sensitivity characteristics represent the relation between the write flying height wfh[nm] and the sector error rate SER. Thus, the inclinations of the lines 41 and 42 represent the flying-dependent error sensitivity [SER/nm].

In the example in FIG. 4, it is assumed that a technique similar to the technique according to the conventional art is used to adjust the format of the recording surface of the disk. If the write flying height is 1 nm, the sector error rate SER of the first type head is equivalent to the sector error rate SER of the second type head and sufficiently low.

However, the line 41 is steeper than the line 42. That is, the first type head has a higher flying-dependent error sensitivity [SER/nm] than the second type head. Furthermore, when the write flying height wfh is larger than 1 nm, the first type head has a higher sector error rate SER than the second type head.

Here, the flying-dependent error sensitivity [SER/nm] of the first type head represented by the line 41 is assumed to be greater than a threshold TH. In this case, in order to reduce the SER (sector error rate) during data read using the first type head by ΔSER, the controller 22 executes format adjustment as follows. The controller 22 reduces the linear recording density BPI of the recording surface (more specifically, a zone within the recording surface) of the disk associated with the first type head. This format adjustment shifts the line representing the flying-dependent error sensitivity characteristics of the first type head in a direction in which the SER decreases by ΔSER as shown by arrow 43 in FIG. 4. That is, the flying-dependent error sensitivity characteristics of the first type head improves by ΔSER from the flying-dependent error sensitivity characteristics indicated by the line 41 to the flying-dependent error sensitivity characteristics indicated by the line 44. This enables a reduction in read errors caused by HFW failures.

Thus, the embodiment executes format adjustment taking the flying-dependent error sensitivity into account after making conventional format adjustment. The conventional format adjustment comprises adjusting the linear recording density BPI for each of the combinations of all heads Hi (i=0, 1, 2, 3) and all zones Zj (j=0, 1, . . . , m) so that the combinations have an equivalent SER in association with a default flying height (write flying height). The equivalent SER means that the SERs of the combinations of all heads Hi and all zones Zj fall within a given range.

Figure 5:
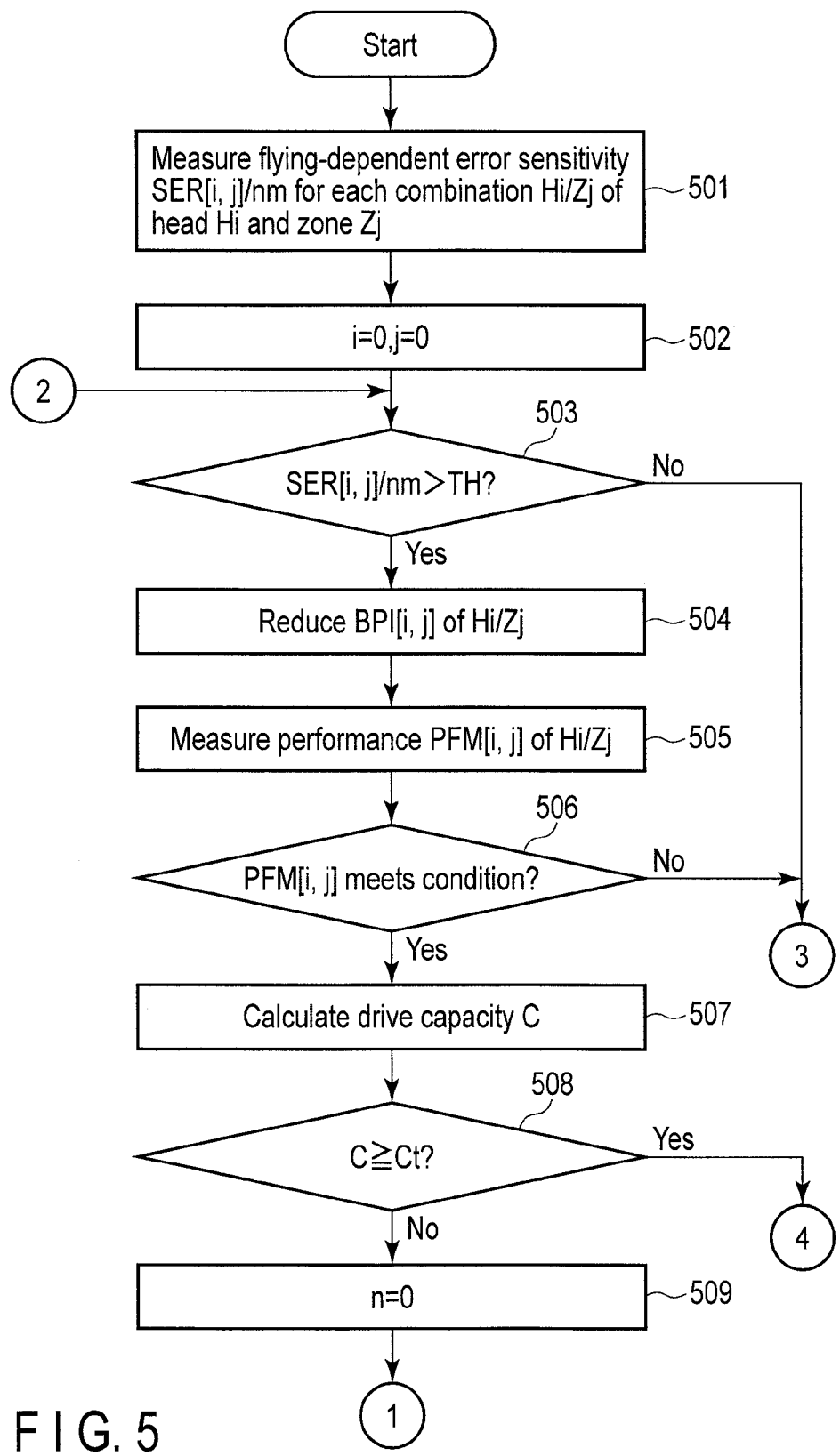
FIG. 5 is a diagram showing a part of a flowchart illustrating an exemplary procedure for format adjustment applied in the embodiment.
Figure 6:
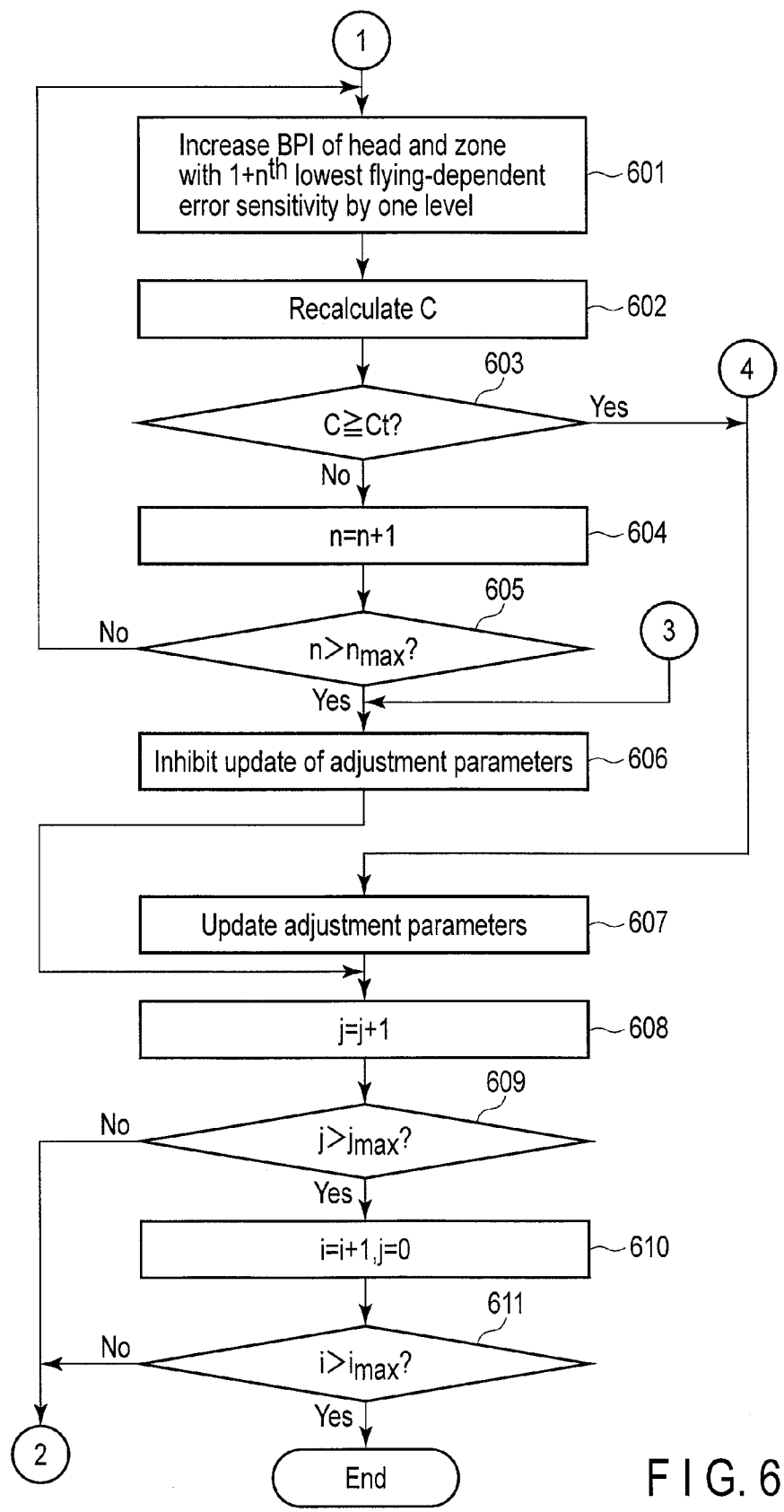
FIG. 6 is a diagram showing the remaining part of the flowchart illustrating the exemplary procedure for format adjustment applied in the embodiment.

The format adjustment applied in the embodiment will be described in detail with reference to flowcharts in FIG. 5 and FIG. 6. First, the controller 22 measures the flying-dependent error sensitivity SER[i, j]/nm for each of the combinations Hi/Zj of all heads Hi (i=0, 1, 2, 3) and all zones Zj (j=0, 1, . . . , m) (block 501). A procedure for a process of measuring the flying-dependent error sensitivity SER[i, j]/nm for each Hi/Zj (block 501) will be described with reference to a flowchart in FIG. 7.

First, the controller 22 sets both a variable i indicative of head Hi and a variable j indicative of zone Zj to an initial value of zero (block 701). The controller 22 then controls the driver IC 15 so that heater power supplied to the heater element in head Hi by the driver IC 15 is set to default heater power whp1 (x=whp=whp1) for write (that is, default write heater power whp1) (block 702). More specifically, the controller 22 sets a parameter value indicative of the write heater power whp1 (write heater power parameter value) in a predetermined register (heater power register) in the driver IC 15. Thus, the driver IC 15 supplies the write heater power whp1 to the heater element in head Hi. According to the embodiment, the unit of heater power is intended to be milliwat (mW).

Then, the controller 22 measures the sector error rate SER (y=SER) of Hi/Zj as follows (block 703). First, with the write heater power whp1 supplied to the heater element in head Hi, the controller 22 writes data, by head Hi, to zone Zj of recording surface RSi of the disk associated with head Hi. The embodiment intends data to be written to a predetermined number of sectors located on an inner circumference, a middle circumference, and an outer circumference of zone Zj of recording surface RSi. However, data may be written to a predetermined number of sectors located on any one of the inner circumference, middle circumference, and outer circumference of zone Zj of recording surface RSi or any circumference of zone Zj. Alternatively, data may be written to entire zone Zj (all the sectors).

Then, the controller 22 controls the driver IC 15 so that the value of the heater power supplied to the heater element in head Hi by the driver IC 15 is switched to a value of heater power for read. In this state, the controller 22 reads data written to zone Zj. During the read, the controller 22 counts the number of read sectors and the number of error sectors, and calculates (measures) the sector error rate SER of Hi/Zj based on the number of read sectors and the number of error sectors. The sector error rate SER (x=SER) measured in block 703 is denoted by ser1.

Then, the controller 22 controls the driver IC 15 so that the heater power supplied to the heater element in head Hi by the driver IC 15 is switched to write heater power whp2 (x=whp=whp2) (block 704). Here, whp2 is lower than whp1 by a predetermined value a. That is, whp2=whp1−α. Thus, the flying height of head Hi increases. In this state, the controller 22 measures the sector error rate SER of Hi/Zj (block 705) as is the case with block 703 described above. The sector error rate SER (x=SER) measured in block 705 is denoted by ser2. The sector error rate ser2 is generally higher than the sector error rate SER measured in block 703.

Then, the controller 22 obtains the heater-power-dependent error sensitivity SER[i, j]/whp of Hi/Zj based on the write heater power whp1, the write heater power whp2, the sector error rate ser1, and the sector error rate ser2 (block 706). The sector error rates ser1 and the sector error rate ser2 are obtained when the write heater power whp1 and the write heater power whp2, respectively, are set. The heater-power-dependent error sensitivity SER[i, j]/whp of Hi/Zj is an index indicative of a change in SER corresponding to a change α in write heater power whp.

Figure 8:
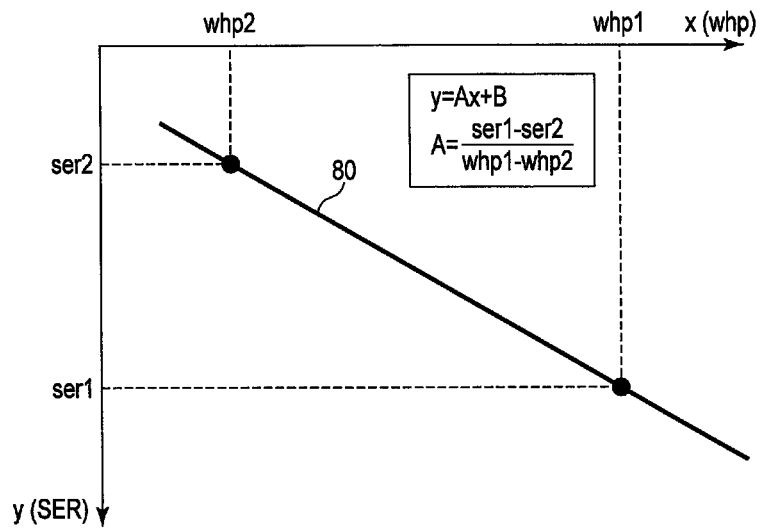
FIG. 8 is a diagram illustrating an exemplary method for obtaining a heater-power-dependent error sensitivity which method is applied in the embodiment.

A method for obtaining (calculating) the heater-power-dependent error sensitivity SER[i, j]/whp which method is applied in block 706 will be described with reference to FIG. 8. The controller 22 determines a line 80 (y=Ax+B) passing through a point (whp1, ser1) and a point (whp2, ser2) in a two-dimensional plane shown in FIG. 8 in which the x-axis represents the write heater power whp and in which the y-axis represents the sector error rate SER. The direction of an arrow on the y-axis is indicative of a negative direction. The x- and y-coordinates of the point (whp1, ser1) correspond to the write heater power whp1 set in block 702 and the sector error rate ser1 measured in block 703, respectively. The x- and y-coordinates of the point (whp2, ser2) correspond to the write heater power whp2 (=whp1−α) set in block 704 and the sector error rate ser2 measured in block 705, respectively.

The controller 22 obtains the inclination A of the line 80 as the heater-power-dependent error sensitivity SER[i, j]/whp of Hi/Zj. To obtain the heater-power-dependent error sensitivity SER[i, j]/whp, the embodiment presets the difference α between the write heater power whp1 and the write heater power whp2 to fall within a range allowing the heater-power-dependent error sensitivity characteristics (that is, the heater-power-dependent error sensitivity characteristics corresponding to the flying-dependent error sensitivity characteristics shown in FIG. 4) to be linearly approximated.

Then, based on the heater-power-dependent error sensitivity SER[i, j]/whp of Hi/Zj and the flying sensitivity nm/whp of head Hi, the controller 22 calculates the flying-dependent error sensitivity SER[i, j]nm of Hi/Zj in accordance with the following expression (block 707).

$$SER[i,j]/nm = (SER[i,j]/whp) \times (whp/nm)$$

Here, whp/nm is the reciprocal of the flying sensitivity nm/whp of head Hi. The flying sensitivity nm/whp of head Hi is an index indicative of a change in the flying height of head Hi corresponding to a change in write heater power supplied to the heater element in head Hi. The embodiment assumes that the flying sensitivity nm/whp of each of heads H0 to H3 has been obtained during the steps of manufacturing the magnetic disk drive shown in FIG. 1 and then stored in the FROM 231.

The flying-dependent error sensitivity SER[i, j]/nm calculated in block 707 is stored in a predetermined area of the RAM 232 in association with Hi/Zj. Then, the controller 22 increments the variable j by one (block 708). The controller 22 then determines whether the incremented variable j exceeds the maximum value $j_{max}$ (that is, m) of the variable j (block 709). If the incremented variable j does not exceed $j_{max}$ (=m) (No in block 709), the controller 22 executes blocks 702 to 707 again in order to obtain (measure) the flying-dependent error sensitivity SER[i, j]/nm of Hi/Zj indicated by the incremented variable j.

On the other hand, if the incremented variable j exceeds $j_{max}$ (=m) (Yes in block 709), the controller 22 determines that the flying-dependent error sensitivity SER[i, j]/nm has been obtained for each of the combinations Hi/Zj of head Hi indicated by the current variable i and all zones Zj (j=0, 1, ..., m). In this case, the controller 22 increments the variable i by one and changes the variable j back to the initial value of zero (block 710).

The controller 22 determines whether the incremented variable i exceeds the maximum value $i_{max}$ (that is, 3) of the variable i (block 711). If the incremented variable i does not exceed $i_{max}$ (=3) (No in block 711), the controller 22 executes above-described blocks 702 to 707 again in order to obtain (measure) the flying-dependent error sensitivity SER[i, j]/nm of Hi/Zj indicated by the incremented variable i and the initial value of the variable j (that is, the flying-dependent error sensitivity SER[i, 0]/nm of Hi/Z0). On the other hand, if the variable i exceeds $i_{max}$ (=3) (Yes in block 711), the controller 22 determines that the flying-dependent error sensitivity SER[i, j]/nm has been obtained for each of the combinations Hi/Zj of all heads Hi (H=0, 1, 2, 3) and all zones Zj (j=0, 1, ..., m).

In this manner, the controller 22 executes above-described blocks 702 to 707 for the combinations Hi/Zj of all heads Hi (H=0, 1, 2, 3) and all zones Zj (j=0, 1, . . . , m). Thus, the controller 22 obtains (measures) the flying-dependent error sensitivity SER[i, j]/nm for each of the combinations Hi/Zj of all heads Hi (H=0, 1, 2, 3) and all zones Zj (j=0, 1, . . . , m). Then, the controller 22 changes an adjustment parameter in the FROM 231 specifying the write heater power whp back to a normal value (block 712). Thus, block 501 in the flowchart in FIG. 5 ends.

Then, the controller 22 sets both the variables i and i to the initial value of zero (block 502). The controller 22 then determines whether the flying-dependent error sensitivity SER[i, j]/nm of Hi/Zj measured in block 501 (that is, the flying-dependent error sensitivity SER[i, j]/nm of the combination of head Hi and zone Zj specified by the variables i and j) is higher than the predetermined threshold TH (block 503). That is, the controller 22 determines whether the SER (read error rate) is degraded even by a slight rise of head Hi.

If the flying-dependent error sensitivity SER[i, j]/nm of Hi/Zj is higher than the threshold TH (Yes in block 503), the controller 22 reduces BPI[i, j] of Hi/Zj by ΔBPI in order to decrease the flying-dependent error sensitivity SER[i, j]/nm (block 504). Here, ΔBPI represents the amount by which the BPI decreases which amount is required to reduce the SER of Hi/Zj by a target SER reduction amount ΔSER. The target SER reduction amount ΔSER is indicative of how much to reduce the SER of Hi/Zj. The embodiment intends the target SER reduction amount ΔSER to be able to be specified by the host in accordance with a user instruction.

The amount ΔBPI is determined based on the target SER reduction amount ΔSER ad the BPI sensitivity BPI/SER of Hi/Zj. The BPI sensitivity BPI/SER of Hi/Zj is indicative of the amount of change in BPI which is required to change the SER of Hi/Zj by a given amount. The controller 22 calculates ΔBPI in accordance with:

$$\Delta BPI = \Delta SER \times (BPI/SER)$$

A method for obtaining (calculating) a BPI (linear recording density) sensitivity BPI/SER will be described with reference to FIG. 9. First, the controller 22 sets the BPI[i, j] of Hi/Zj (that is, the BPI of zone Zj of recording surface RSi associated with head Hi) to BPI1 by format adjustment. More specifically, the controller 22 sets a parameter value specifying BPI1 (BPI parameter value) in a predetermined register (BPI register). Thus, zone Zj of recording surface RSi is formatted so as to set the BPI[i, j] of Hi/Zj to BPI1. BPI1 is, for example, a default BPI. Then, the controller 22 measures the sector error rate SER=ser1 at BPI1 by writing, by head Hi, data to zone Zj of recording surface RSi associated with head Hi and subsequently reading the data from zone Zj.

Then, the controller 22 reduces the BPI[i, j] of Hi/Zj from BPI1 to BPI2 by format adjustment. The BPI parameter value specifying BPI2 is assumed to be smaller than the BPI parameter value specifying BPI1 by, for example, the minimum value (the value corresponding to one bit). That is, the controller 22 reduces the BPI of Hi/Zj by one level from BPI1 to BPI2. The controller 22 then measures the sector error rate SER=ser2 at BPI2 as is the case with the measurement of the sector error rate SER=ser1 at BPI1.

Figure 9:
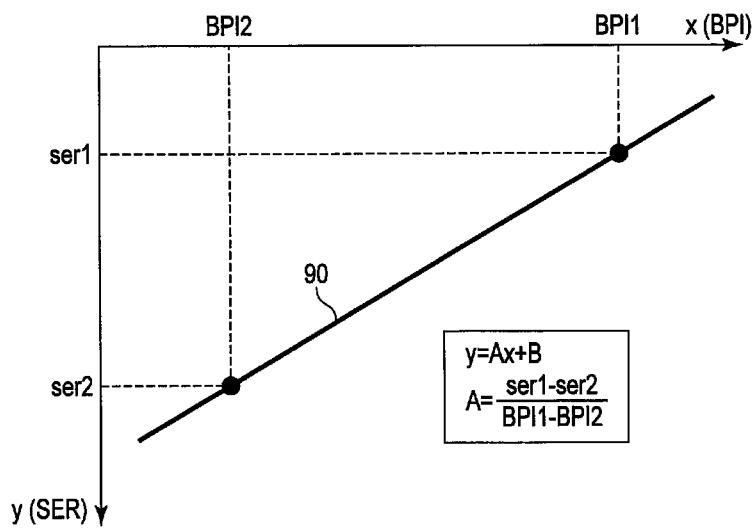
FIG. 9 is a diagram illustrating an exemplary method for obtaining a linear recording density sensitivity which method is applied in the embodiment.

Then, the controller 22 determines a line 90 (y=Ax+B) passing through a point (BPI1, ser1) and a point (BPI2, ser2) in a two-dimensional plane shown in FIG. 9 in which the x-axis represents BPI and in which the y-axis represents the sector error rate SER. The controller 22 obtains the reciprocal of the inclination A of the line 90 as the BPI sensitivity BPI/SER of Hi/Zj. The controller 22 calculates ΔBPI as described above based on the BPI sensitivity BPI/SER and the target SER reduction amount ΔSER. The controller 22 then executes above-described block 504 to reduces the BPI [i, j] of Hi/Zj by ΔBPI.

Then, the controller 22 measures the performance PFM[i, j] of Hi/Zj (block 505). According to the embodiment, the performance PFM[i, j] of Hi/Zj is an access speed at which zones Zj of recording surface RSi of the disk associated with head Hi are sequentially accessed (that is, a data transfer speed). The controller 22 then determines whether the measured performance PFM[i, j] meets a condition (block 506). If the measured performance PFM[i, j] meets the condition (Yes in block 506), the controller 22 proceeds to block 507. That is, if the performance PFM[i, j] meets the condition in spite of a reduction in the BPI[i, j] of Hi/Zj by ΔBPI, the controller 22 proceeds to block 507.

In block 507, the controller 22 calculates the capacity C of the magnetic disk drive shown in FIG. 1 (that is, the drive capacity) in the state where the BPI[i, j] of Hi/Zj has been reduced by ΔBPI. The controller 22 then determines whether the calculated capacity C is greater than or equal to a target capacity Ct (block 508). If the capacity C is less than the target capacity Ct (No in block 508), the controller 22 proceeds to block 509. That is, even when the performance PFM[i, j] meets the condition (Yes in block 506), the controller proceeds to block 509 if the capacity C is smaller than the target capacity Ct because of reduced BPI[i, j].

In contrast, if the capacity C is greater than or equal to the target capacity Ct (Yes in block 508), the controller 22 updates the adjustment parameters in the FROM 231 so that the adjustments hitherto made to the format are reflected in the adjustment parameters (block 607). Furthermore, if the flying-dependent error sensitivity SER[i, j]/nm of Hi/Zj is not higher than the threshold TH (No in block 503) or if the performance PFM[i, j] fails to meet the condition (No in block 506), the controller 22 inhibits the update of the adjustment parameters (block 606).

In block 509, the controller 22 sets a variable n to the initial value of zero. The controller 22 then identifies the $1+n^{th}$ lowest flying-dependent error sensitivity SER[u, v]/nm of the flying-dependent error sensitivities obtained in block 501. Here, u is one of 0 to 3, and v is one of 0 to m. However, u≠i and v≠j. That is, the flying-dependent error sensitivity SER[i, j]/nm of Hi/Zj indicated by the currently set variables i and j is excluded. To identify the $1+n^{th}$ lowest flying-dependent error sensitivity SER[u, v]/nm, the controller 22 may sort the flying-dependent error sensitivities obtained in block 501 in order of increasing flying-dependent error sensitivity.

The controller 22 proceeds to block 601 in order to increase the capacity C of the magnetic disk drive shown in FIG. 1. In block 601, the controller 22 increases, by one level, the BPI of head Hu and zone Zv corresponding to the identified flying-dependent error sensitivity SER[u, v]/nm, that is, the BPI of head Hu and zone Zv (Hu/Zv) with the $1+n^{th}$ lowest flying-dependent error sensitivity. In first block 601, n=0, and thus the BPI of Hu/Zv with the lowest flying-dependent error sensitivity is increased by one level.

Then, the controller 22 calculates the capacity C again (block 602). That is, the controller 22 calculates the capacity C in the state where the BPI of Hu/Zv has been increased by one level. The controller 22 determines whether the calculated capacity C is greater than or equal to the target capacity Ct (block 603).

If the capacity C is less than the target capacity Ct (No in block 603), the controller 22 increments the variable n by 1 (block 604). The controller 22 then determines whether the incremented variable n exceeds the maximum value $n_{max}$ of the variable n (block 605). Here, $n_{max}$ is a number smaller than the number of combinations of all the zones and all the heads by 2, namely, a number represented by $(i_{max}+1)\times(j_{max}+1)-2$, that is, $4(m+1)-2$.

If the incremented variable n does not exceed $n_{max}$ (No in block 605), the controller 22 executes block 601 again in order to further increase the capacity of the controller 22. In second block 601, n=1, and thus the BPI of HU/Zv with the second lowest flying-dependent error sensitivity is increased by one level. At this time, the BPI of the head/zone with the lowest flying-dependent error sensitivity has already been increased by one level in above-described block 601.

Thus, the controller 22 repeats blocks 601 to 603 (block 605) while incrementing the variable n by 1 (block 604) until the capacity C reaches the target capacity Ct. However, even when the capacity C fails to reach the target capacity Ct (No in block 603), the controller 22 ends the repetition of blocks 601 to 603 and proceeds to block 606 if the incremented variable n exceeds $n_{max}$ (Yes in block 605). In block 606, the controller 22 inhibits the update of the adjustment parameters.

On the other hand, if the capacity C is greater than or equal to the target capacity Ct (Yes in block 603), the controller 22 proceeds to block 607. In block 607, the controller 22 updates the adjustment parameters so that the adjustments hitherto made to the format are reflected in the adjustment parameters.

Upon executing block 606 or 607, the controller 22 increments the variable j by 1 (block 608). Then, the controller 22 determines whether the incremented variable j exceeds $j_{max}$ (that is, m) (block 609). If the incremented variable j does not exceed $j_{max}$ (=m) (No in block 609), the controller 22 returns to block 503 in order to evaluate the flying-dependent error sensitivity SER[i, j]/nm of Hi/Zj indicated by the incremented variable j. Thus, the flying-dependent error sensitivity is evaluated for each of the combinations of head Hi and all zones Z0 to Zm, and based on the evaluation results, executes format adjustment.

In contrast, if the incremented variable j exceeds $j_{max}$ (=m) (Yes in block 609), the controller 22 increments the variable i by 1 and changes the variable j back to the initial value of zero (block 610). The controller 22 determines whether the incremented variable i exceeds the maximum $i_{max}$ (that is, 3) of the variable i (block 611). If the incremented variable i does not exceed $i_{max}$ (=3) (No in block 611), the controller 22 returns to block 503 in order to evaluate the flying-dependent error sensitivity SER[i, j]/nm of Hi/Zj indicated by the incremented variable i and the initial value of the variable j (that is, the flying-dependent error sensitivity SER[i, 0]/nm of Hi/Z0).

Thus, the flying-dependent error sensitivity is evaluated for each of the combinations of all heads H0 to H3 and all zones Z0 to Zm, and based on the evaluation results, executes format adjustment. Thus, the embodiment adjusts the format (BPI) so that the combinations Hi/Zj of all heads Hi (i=0, 1, 2, 3) and all zones Zj (j=0, 1, . . . , m) have an equivalent SER, and then fine-tunes the format (BPI) of Hi/Zj in accordance with the flying-dependent error sensitivity of Hi/Zj. Hence, the embodiment can prevent the read error rate from being increased by a slight increase in head flying height during write caused by, for example, an HFW failure. As a result, the embodiment can improve the yield of the steps of manufacturing magnetic disk drives and further the quality of the magnetic disk drives.

MODIFICATION

Now, a modification of the embodiment will be described. The embodiment obtains the flying-dependent error sensitivity SER[i, j]/nm for each of the combinations Hi/Zj of all heads Hi (i=0, 1, 2, 3) and all zones Zj (j=0, 1, . . . , m). Then, the embodiment adjusts BPI for each Hi/Zj based on the flying-dependent error sensitivity SER[i, j]/nm. In contrast, the modification obtains the flying-dependent error sensitivity SER[i]/nm for each head Hi. The modification adjusts BPI for each Hi based on the flying-dependent error sensitivity SER[i]/nm.

Figure 11:
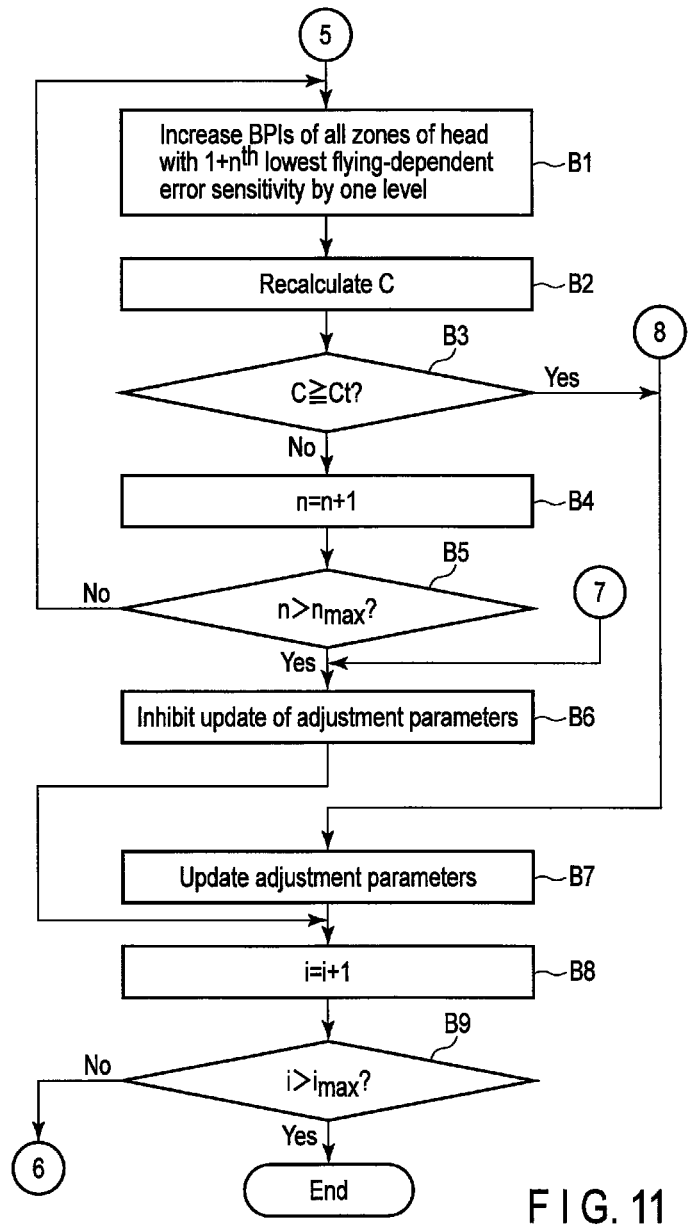
FIG. 11 is a diagram showing the remaining part of the flowchart illustrating the exemplary procedure for format adjustment applied in the modification.
Figure 12:
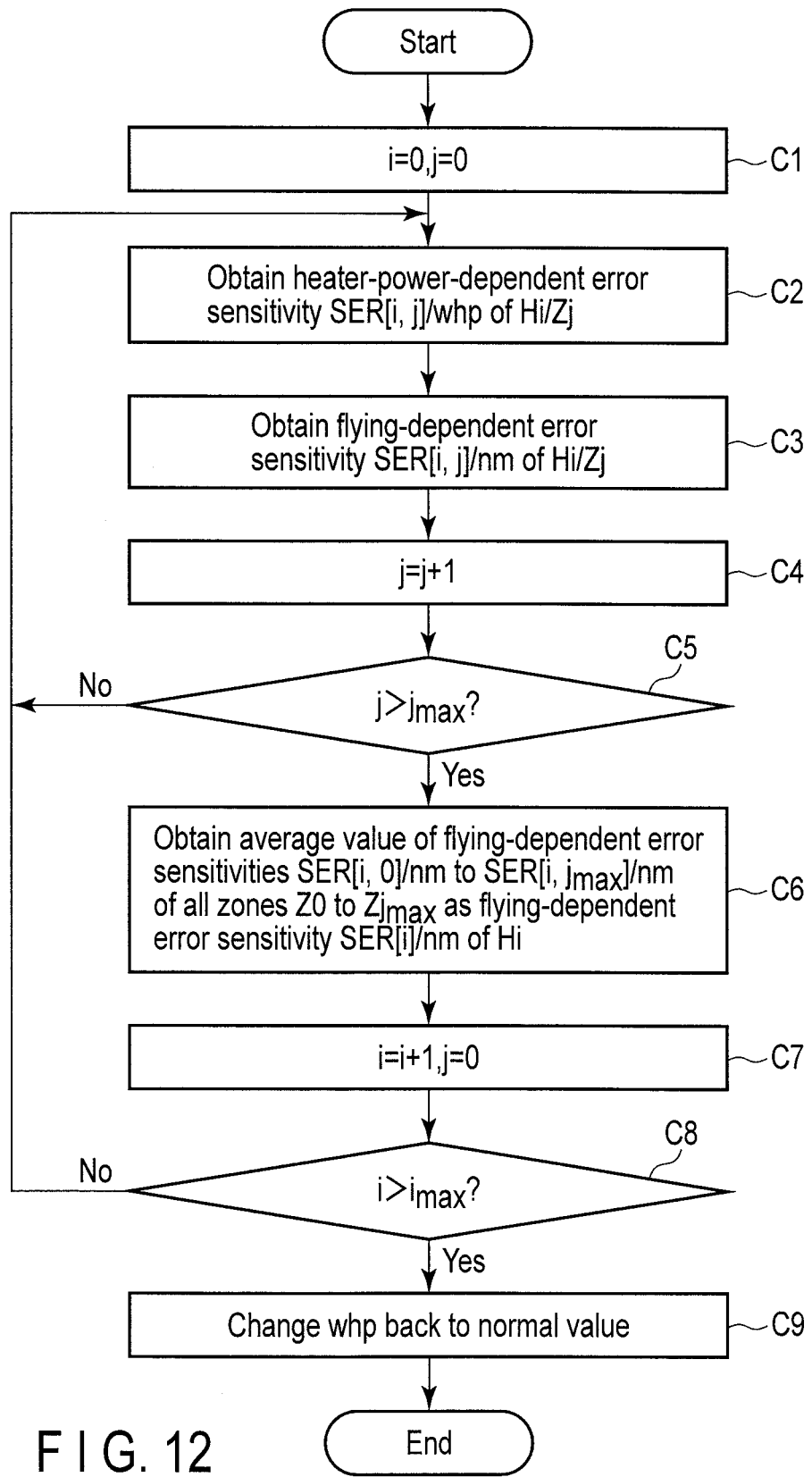
FIG. 12 is a flowchart illustrating an exemplary procedure for a process of measuring a flying-dependent error sensitivity for each head which process is applied in the embodiment.

Now, the format adjustment applied in the modification will be described with reference to flowcharts in FIG. 10 and FIG. 11 focusing on differences from the embodiment. First, the controller 22 measures the flying-dependent error sensitivity SER[i]/nm of each head Hi (i=0, 1, 2, 3) (block A1). A procedure for a process of measuring the flying-dependent error sensitivity SER[i]/nm for each Hi (block A1) will be described with reference to a flowchart in FIG. 12 focusing on differences from the embodiment.

Figure 7:
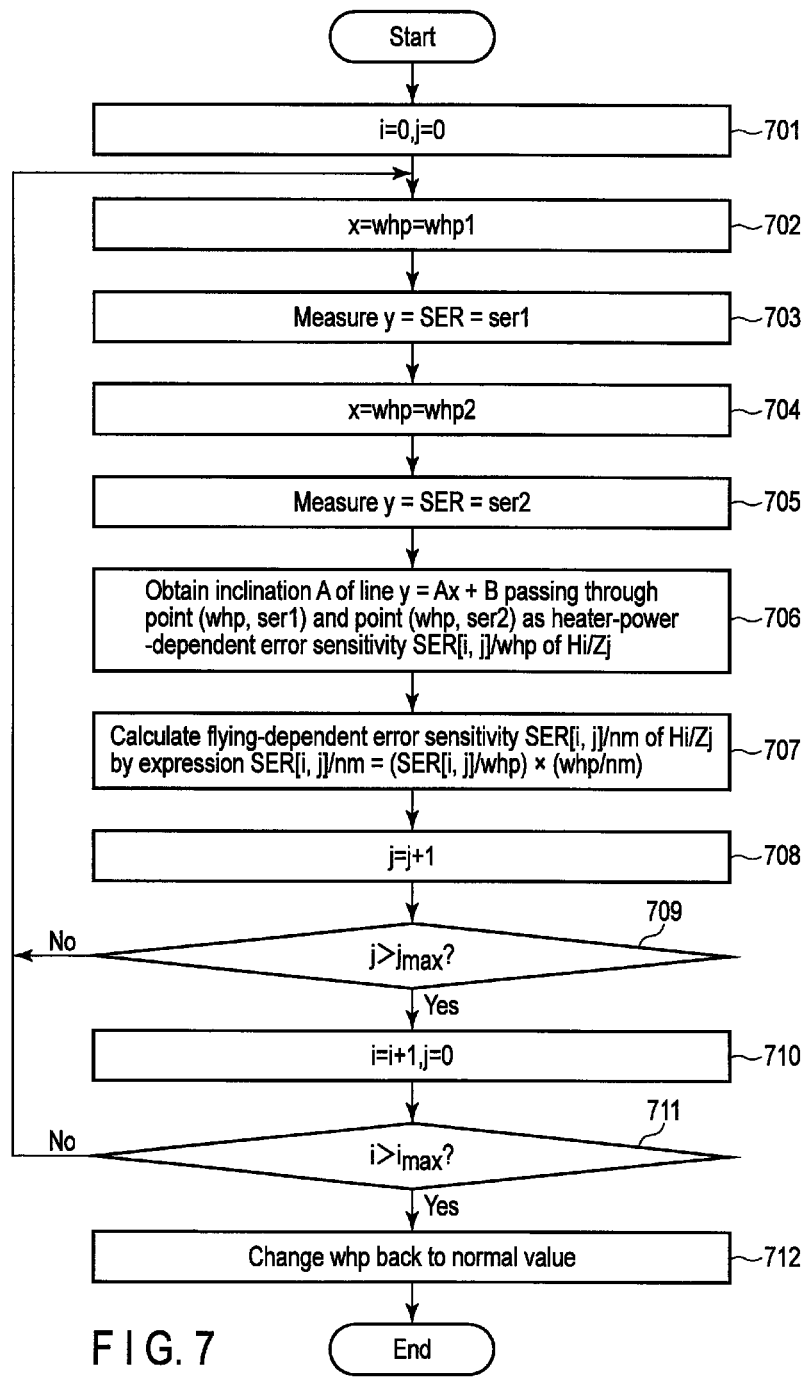
FIG. 7 is a flowchart illustrating an exemplary procedure for a process of measuring a flying-dependent error sensitivity for each of the combinations of all heads and all zones which process is applied in the embodiment.

The controller 22 executes block C1 corresponding to block 701 in FIG. 7 and subsequently blocks C2 to C5 corresponding to blocks 702 to 709 in FIG. 7 $j_{max}$ (=m)+1 times. Thus, the controller 22 obtains the flying-dependent error sensitivity SER[i, j]/nm for each of the combinations Hi/Zj of head Hi and all zones Zj (j=0, 1, . . . m). Then, the controller 22 calculates the average value of the flying-dependent error sensitivities SER[i, 0]/nm, SER[i, 1]/nm, . . . SER[i, m]/nm for the combinations Hi/Z0, Hi/Z1, . . . Hi/Zm of head Hi and all zones Zj (j=0, 1, . . . , m). The controller 22 obtains the average value as the flying-dependent error sensitivity SER [i]/nm of head Hi (block C6).

The controller 22 repeats a process of obtaining the flying-dependent error sensitivity SER[i]/nm of head Hi, for each of all heads H0 to H3 (blocks C7 and C8). Upon obtaining the flying-dependent error sensitivity SER[i]/nm for all heads Hi (i=0, 1, 2, 3), the controller 22 changes the adjustment parameter in the FROM 231 specifying the write heater power whp back to the normal value (block C9). Thus, block A1 in the flowchart in FIG. 10 ends.

The subsequent operation is similar to the operation according to the embodiment. However, the embodiment evaluates the flying-dependent error sensitivity SER[i, j]/nm for each combination Hi/Zj of head Hi and zone Zj, and based on the evaluation results, adjusts BPI[i, j] for each Hi/Zj (blocks 502 to 509 and 601 to 611). In contrast, the modification evaluates the flying-dependent error sensitivity SER [i]/nm for each head Hi, and based on the evaluation results, adjusts BPI for each Hi (blocks A2 to A9 and B1 to B9), as described below.

First, the variable i is set to the initial value of zero (block A2) and subsequently the flying-dependent error sensitivity SER[i]/nm is evaluated (block A3). If the flying-dependent error sensitivity SER[i]/nm is less than or equal to the threshold TH (No in block A3), the controller 33 proceeds to block B6. In contrast, if the flying-dependent error sensitivity SER [i]/nm is greater than the threshold TH (Yes in block A3), the controller 22 uniformly adjusts the BPIs of all zones Z0 to Zm on recording surface RSi associated with head Hi, as described below (block A4).

The controller 22 determines the amount by which BPI[i] is adjusted, that is, the reduction amount ΔBPI, based on the target SER reduction amount £SER and the average value AV(BPI/SER). The average value AV(BPI/SER) is the average value of the BPI sensitivities BPI/SER of all zones Z0 to Zm on recording surface RSi. That is, the controller 22 calculates ΔBPI in accordance with:

ΔBPI=ΔSER×AV(BPI/SER)

The controller 22 executes above-described block A4 to uniformly reduce the BPIs of all zones Z0 to Zm on recording surface RSi associated with head Hi by ΔBPI.

Then, the controller 22 measures the performance PFM[i] of Hi (block A5). According to the modification, the performance PFM[i] of Hi is a data transfer speed at which data is transferred to sequentially access recording surface RSi of the disk associated with head Hi. The controller 22 then determines whether the measured performance PFM[i] meets a condition (block A6).

If the measured performance PFM[i] does not meet the condition (No in block A6), the controller 22 proceeds to block B6. In contrast, if the measured performance PFM[i] meets the condition (Yes in block A6), the controller 22 calculates the drive capacity C in the state where the BPIs of all zones Z0 to Zm of head Hi have been reduced by ΔBPI (block A7). The controller 22 then determines whether the calculated capacity C is greater than or equal to the target capacity Ct (block A8). If the capacity C is greater than or equal to the target capacity Ct (Yes in block A8), the controller 22 updates the adjustment parameters in the FROM 231 so that the adjustments hitherto made to the format are reflected in the adjustment parameters (block B7).

In contrast, if the capacity C is less than the target capacity Ct (No in block A8), the controller 22 increases the BPIs of all zones Z0 to Zm of head Hu with the lowest flying-dependent error sensitivity by one level (blocks A9 and B1). Then, the controller 22 calculates the capacity C again (block B2), and determines whether the calculated capacity C is greater than or equal to the target capacity Ct (block B3). If the capacity C is greater than or equal to the target capacity Ct (Yes in block B3), the controller 22 updates the adjustment parameters in the FROM 231 so that the adjustments hitherto made to the format are reflected in the adjustment parameters (block B7).

In contrast, if the capacity C is less than the target capacity Ct (No in block B3), the controller 22 increases the BPIs of all zones Z0 to Zm of head Hu with the second lowest flying-dependent error sensitivity by one level (blocks B4, B5, and B1). At this time, the BPIs of all the zones of the head with the lowest flying-dependent error sensitivity has already been increased by one level in above-described block B1.

Thus, the controller 22 repeats blocks B1 to B3 until the capacity C is greater than or equal to the target capacity Ct (blocks B4 and B5). However, if the capacity C is still less than the target capacity Ct even though the BPIs of all the zones of the head with the lowest flying-dependent error sensitivity to the $(1+n_{max})^{th}$ lowest flying-dependent error sensitivity have been increased (No in block B3 and Yes in block B5), the controller 22 proceeds to block B6. Here, $n_{max}$ is $i_{max}-1$ (=2). In block B6, the controller 22 inhibits the update of the adjustment parameters.

Upon executing block B6 or B7, the controller 22 increments the variable i by 1 (block 88). Then, the controller 22 determines whether the incremented variable i exceeds $i_{max}$ (that is, 3) (block B9). If the incremented variable i does not exceed $i_{max}$ (=3) (No in block B9), the controller 22 returns to block A3 in order to evaluate the flying-dependent error sensitivity SER[i]/nm of head Hi indicated by the incremented variable i.

As described above, the flying-dependent error sensitivity is evaluated for each of all heads Hi, and based on the evaluation results, format adjustment is executed. Thus, the modification adjusts the format (BPI) so that the combinations Hi/Zj of all heads Hi (i=0, 1, 2, 3) and all zones Zj (j=0, 1, . . . , m) have an equivalent SER, and then fine-tunes the formats (BPIs) of all the zones associated with head Hi in accordance with the flying-dependent error sensitivity of head Hi. Hence, the modification can prevent the read error rate from being increased by a slight increase in head flying height during write.

As described above, the embodiment and the modification thereof adjust the format (BPI) taking the flying-dependent error sensitivity into account after adjusting the format so that the combinations Hi/Zj of all heads Hi and all zones Zj have an equivalent SER. However, the adjustment of the format (BPI) with the flying-dependent error sensitivity taken into account may be executed after, for example, each zone is adjusted (set) to a predetermined (that is, a default) format BPI.

Furthermore, the embodiment and the modification thereof assume that each of the recording surfaces of disks $11_{-0}$ and $11_{-1}$ is partitioned into m+1 zones Z0 to Zm. However, each of the recording surfaces of disks $11_{-0}$ and $11_{-1}$ need not necessarily be partitioned into a plurality of zones. In this case, as is the case with the modification of the embodiment, the formats (BPIs) of recording surface RS0 to RS3 associated with heads H0 to H3 may be fine-tuned in accordance with the flying-dependent error sensitivities of heads H0 to H3. Here, the flying-dependent error sensitivity of head Hi (i=0, 1, 2, 3) may be obtained by writing data to, for example, the inner circumference, middle circumference, and outer circumference of recording surface RSi and then reading the written data.

Furthermore, the embodiment and the modification assume a magnetic disk drive comprising two disks $11_{-0}$ and $11_{-1}$. However, the magnetic disk drive may comprise a single disk or more than two stacked disks.

The above-described at least one embodiment can prevent the read error rate from being increased by a slight increase in head flying height during write.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method, implemented in a magnetic disk drive, for adjusting a linear recording density, the magnetic disk drive comprising one or more disks and two or more heads, the one or more disks comprising two or more recording surfaces, the two or more heads being associated with the respective two or more recording surfaces, each of two or more recording surfaces comprising a plurality of zones, the method comprising:

obtaining a flying-dependent error sensitivity for each of a plurality of combinations of the two or more heads and the plurality of zones, the flying-dependent error sensitivity representing a change in read error rate corresponding to a change in flying height of the head during write;

comparing the obtained flying-dependent error sensitivity of each of the plurality of combinations with a threshold;

reducing a linear recording density of a first zone of a first combination if a flying-dependent error sensitivity of the first combination is higher than the threshold;

calculating a capacity of the magnetic disk drive in a state in which the linear recording density is reduced;

identifying a second combination having a lowest flying-dependent error sensitivity, among the obtained flying-dependent error sensitivities of the plurality of combinations, if the calculated capacity is smaller than a target capacity; and increasing a linear recording density of a second zone of the identified second combination.

2. The method of claim 1, wherein obtaining the flying-dependent error sensitivity comprises:

measuring a first read error rate and a second read error rate for each of the plurality of the combinations the first read error rate and the second read error rate each being indicative of a rate at which a read error occurs when data is written to the zone of the recording surface associated with the head and then the written data is read, in a first state and a second state, respectively, in which the head has different flying heights; and obtaining the flying-dependent error sensitivity for each of the plurality of the combinations based on the first read error rate and the second read error rate.

3. The method of claim 1, further comprising recalculating the capacity of the magnetic disk drive when the linear recording density is increased, wherein:

identifying the second combination comprises identifying a third combination having a second lowest flying-dependent error sensitivity, among the obtained flying-dependent error sensitivities of the plurality of combinations, if the recalculated capacity is smaller than the target capacity; and increasing the linear recording density comprises increasing a linear recording density of a third zone of the identified third combination.

4. The method of claim 1, wherein the linear recording density of the first zone is reduced by a first amount needed to reduce an error rate by a specified value, and the error rate is indicative of a rate at which a read error occurs when data is written to the first zone and then the written data is read.

5. A method, implemented in a magnetic disk drive, for adjusting a linear recording density, the magnetic disk drive comprising one or more disks and two or more heads, the one or more disks comprising two or more recording surfaces, the two or more heads being associated with the respective two or more recording surfaces, each of two or more recording surfaces comprising a plurality of zones, the method comprising:

obtaining a first flying-dependent error sensitivity for each of the two or more heads, the first flying-dependent error sensitivity representing a change in read error rate corresponding to a change in flying height of the head during write;

comparing the obtained first flying-dependent error sensitivity of each of the two or more heads with a threshold; and reducing a linear recording density of a first recording surface associated with a first head of the two or more heads if a first flying-dependent error sensitivity of the first head is higher than the threshold, wherein obtaining the first flying-dependent error sensitivity comprises measuring a first read error rate and a second read error rate for each of a plurality of combinations of the two or more heads and the plurality of zones, the first read error rate and the second read error rate each being indicative of a rate at which a read error occurs when data is written to the zone of the recording surface associated with the head and then the written data is read, in a first state and a second state, respectively, in which the head has different flying heights; and obtaining a second flying-dependent error sensitivity for each of the plurality of the combinations based on the first read error rate and the second read error rate, the second flying-dependent error sensitivity representing a change in the read error rate corresponding to a change in the flying height of the head during write; and obtaining, for each of the two or more heads, an average value of the obtained second flying-dependent error sensitivities for the combinations of the head and the respective plurality of zones as the first flying-dependent error sensitivity.

6. A magnetic disk drive comprising:

one or more disks each comprising two or more recording surfaces;

two or more heads associated with the respective two or more recording surfaces, each of two or more recording surfaces comprising a plurality of zones;

a flying-dependent error sensitivity obtaining controller configured to obtain a flying-dependent error sensitivity for each of a plurality of combinations of the two or more heads and the plurality of zones, the flying-dependent error sensitivity representing a change in read error rate corresponding to a change in flying height of the head during write;

a determination controller configured to determine whether the obtained flying-dependent error sensitivity of each of the plurality of combinations is higher than a threshold by comparing the obtained flying-dependent error sensitivity with the threshold;

a linear recording density adjuster configured to reduce a linear recording density of a first zone of a first combination if a flying-dependent error sensitivity of the first combination is higher than the threshold; and a calculator configured to calculate a capacity of the magnetic disk drive in a state in which the linear recording density is reduced, wherein the linear recording density adjuster is further configured to:

identify a second combination having a lowest flying-dependent error sensitivity, among the obtained flying-dependent error sensitivities of the plurality of combinations, if the calculated capacity is smaller than a target capacity; and increase a linear recording density of a second zone of the identified second combination.

7. The magnetic disk drive of claim 6, wherein the flying-dependent error sensitivity obtaining controller is configured to:

measure a first read error rate and a second read error rate for each of the plurality of the combinations, the first read error rate and the second read error rate each being indicative of a rate at which a read error occurs when data is written to the zone of the recording surface associated with the head and then the written data is read, in a first state and a second state, respectively, in which the head has different flying heights; and obtain the flying-dependent error sensitivity for each of the plurality of the combinations based on the first read error rate and the second read error rate.

8. The magnetic disk drive of claim 6, wherein:

the calculator is further configured to recalculate the capacity of the magnetic disk drive when the linear recording density is increased; and the linear recording density adjuster is further configured to:

identify a third combination having a second lowest flying-dependent error sensitivity, among the obtained flying-dependent error sensitivities of the plurality of combinations, if the recalculated capacity is smaller than the target capacity; and increase a linear recording density of a third zone of the identified third combination.

9. The magnetic disk drive of claim 6, wherein the linear recording density adjuster is further configured to reduce the linear recording density of the first zone by a first amount needed to reduce an error rate by a specified value, and the error rate is indicative of a rate at which a read error occurs when data is written to the first zone and then the written data is read.

* * * * *